(12) United States Patent
Busch et al.

(10) Patent No.: US 6,895,066 B1
(45) Date of Patent: May 17, 2005

(54) MEASURING HEAD AND MEASURING ASSEMBLY FOR A NUCLEAR FUEL ROD

(75) Inventors: Alexander Busch, Erlangen (DE); Jürgen Zuleger, Langensendelbach (DE); Klaus Dittkuhn, Hemhofen (DE); Rainer Schumann, Erlangen (DE)

(73) Assignee: Framatome ANP GmbH, Erlangen (DE)

( * ) Notice: Subject to any disclaimer, the term of this patent is extended or adjusted under 35 U.S.C. 154(b) by 0 days.

(21) Appl. No.: 10/715,071

(22) Filed: Nov. 17, 2003

Related U.S. Application Data

(63) Continuation of application No. PCT/EP02/05217, filed on May 13, 2002.

(30) Foreign Application Priority Data

May 17, 2001 (DE) .......................................... 101 23 975

(51) Int. Cl.[7] .............................................. G21C 17/00
(52) U.S. Cl. ...................... 376/258; 376/245; 376/261; 73/573
(58) Field of Search ................................ 376/258, 245, 376/261, 251, 252; 73/573

(56) References Cited

U.S. PATENT DOCUMENTS

| 3,308,476 A | * | 3/1967 | Kleesattel ..................... 73/573 |
|---|---|---|---|
| 3,572,097 A | * | 3/1971 | Kleesattel ..................... 73/573 |
| 3,884,076 A | | 5/1975 | Studer |
| 3,958,450 A | * | 5/1976 | Kleesattel ..................... 73/573 |
| 4,722,142 A | | 2/1988 | Schmidt |
| 5,001,841 A | * | 3/1991 | Takigawa et al. .............. 33/551 |
| 5,124,641 A | | 6/1992 | Netter et al. |
| H1262 H | * | 12/1993 | Bacvinskas et al. ......... 376/252 |
| 5,343,146 A | | 8/1994 | Koch et al. |
| 5,754,611 A | | 5/1998 | Petit |

FOREIGN PATENT DOCUMENTS

| DE | 43 33 419 A1 | 4/1994 |
|---|---|---|
| DE | 42 10 689 A1 | 12/1994 |
| DE | 696 01 683 T2 | 4/1997 |
| DE | 196 16 248 A1 | 10/1997 |
| EP | 0 766 265 B1 | 4/1997 |

\* cited by examiner

*Primary Examiner*—Michael J. Carone
*Assistant Examiner*—R Palabrica
(74) *Attorney, Agent, or Firm*—Laurence A. Greenberg; Werner H. Stemer; Ralph E. Locher

(57) ABSTRACT

A measuring head is used in measuring an assembly part of a nuclear facility, such as a fuel rod, a fuel assembly box, or a spacer of the fuel assembly. The measuring head is capable of augmenting a comparatively large data base representing the overall aging state of the fuel elements in a simple manner and within a short measuring time. The measuring head has a probe tip on the sensor housing and a layer thickness measuring probe is integrated into said probe housing, said measuring probe working according to the eddy current principle. The contour or the diameter of the fuel rod can be determined by the measured deflection of the probe.

9 Claims, 3 Drawing Sheets

MEASURING HEAD AND MEASURING ASSEMBLY FOR A NUCLEAR FUEL ROD

CROSS-REFERENCE TO RELATED APPLICATION

This application is a continuation of copending International Application No. PCT/EP02/05217, filed May 13, 2002, which designated the United States and which was not published in English.

BACKGROUND OF THE INVENTION

Field of the Invention

The invention relates to a measuring head, in particular for use in the measurement of a fuel rod of a fuel assembly and/or a spacer in a fuel assembly of a nuclear engineering installation. The invention also relates to a measuring device having a measuring head of this type and to the implementation of a measuring device of the type.

To generate electrical energy in a nuclear installation, in particular in a nuclear power plant, it is customary for fissile material to be subjected to controlled nuclear fission. The fissile material is held in a number of fuel rods, in which the material, for example in the form of pellets, is surrounded by suitable cladding tubes. A plurality of fuel rods of this type are usually combined to form a fuel assembly. It is thereby ensured, even in long-term operation of the nuclear engineering installation, that a predetermined geometry is maintained and in particular that specified distances between the fuel rods of a fuel assembly are maintained by means of suitable spacers.

When a nuclear engineering installation of this type is operating, the respective components or installed parts are subject to ageing processes, such as for example corrosion. Furthermore, components of this type are also exposed to radioactive radiation over a prolonged period of time, which may in addition to the standard ageing-induced corrosion or fatigue effects also lead to changes in shape or dimensions. This may in turn have an adverse effect on the performance or reliability of the component in question. Particularly when using fuel rods, ageing-induced effects of this type can lead to the phenomenon known as creep, in which the fuel rod in question changes, inter alia, its diameter. Furthermore, however, it is also possible for oxidation to occur at the surface of a fuel rod, as a type of corrosion, which may lead to the formation of a more or less continuous oxide layer on the surface of the fuel rod. Depending on the thickness of the oxide layer which forms, the wall thickness of the cladding tube below may be adversely affected, even to such an extent that it drops below a limit wall thickness which is still classified as acceptable for the fuel rod to continue to operate. Both effects, i.e. the changes in shape or dimensions, on the one hand, and the formation of oxide layers, on the other hand, may therefore together or even individually cause the reliability and correct functioning of the fuel rod in question to be adversely affected.

For this reason, as part of regular maintenance, it is customary to test installed parts in a nuclear engineering installation for the occurrence of such effects. In this context, the term "installed part" is to be understood as meaning in particular a fuel rod, a fuel assembly channel, a spacer or some other structural part in the nuclear engineering installation. When carrying out a check of this type, on the one hand a measurement is carried out on a random sample of the installed parts to determine whether a significant change has occurred in the fuel rod diameter, also, the corresponding installed parts are subjected to a random sample measurement to check for changes in shape and dimensions. Specially produced sensors, which can be used to acquire sample measurement data for selected installed parts, in particular selected installed fuel rods, can be used for these maintenance and test measurements.

Independently of this, on the other hand, a sample examination is carried out on the installed parts at regular maintenance intervals to determine whether and to what extent oxide layers have formed. These measurement results are used to draw conclusions as to the ageing state of these components, it being possible in particular to replace some or all of the fuel rods as required. Specifically designed measuring devices, in which a suitable measuring probe is used to determine measurement data concerning the layer thickness of the oxide layer on selected fuel rods or other installed parts, are likewise employed to determine the corresponding measurement data.

However, it is still a relatively complex matter to determine information concerning the ageing state of the corresponding installed part, in particular the fuel rods or spacers, in this way. In particular, the above-mentioned measurements may entail down times in the nuclear engineering installation, and such down times need to be kept particularly short if only for economic reasons. To maintain relatively short down times, it may be necessary for the sample measurements to be restricted to a relatively small number of the components which are to be measured, in particular fuel rods or spacers, and consequently the database available for reliable assessment is relatively small. This in turn may lead to unacceptable inaccuracy when determining the state of the fuel elements and in particular forecasting the future ageing-induced performance of the fuel assemblies.

SUMMARY OF THE INVENTION

It is accordingly an object of the invention to provide a measuring head, which overcomes the above-mentioned disadvantages of the heretofore-known devices and methods of this general type and which is particularly suited for use in the measurement of an installed part of the above type, for example of a fuel rod of a fuel assembly channel and/or a spacer, in a fuel assembly of a nuclear engineering installation, which makes it possible, in a particularly simple way and within a short measuring time, to build up a relatively large database which overall is representative of the ageing state of the fuel assemblies. Moreover, it is intended to provide a measuring device which is particularly suitable for use in measuring an installed part of this type, in particular a fuel rod and/or spacer.

With the foregoing and other objects in view there is provided, in accordance with the invention, a fuel rod testing assembly, comprising:

a plurality of measuring devices each having a sensing arm with a laterally deflectable free end;

a measuring head carried on the free end of the sensing arm, the measuring head having a sensor housing and a sensing tip disposed on the sensor housing;

a layer thickness measuring probe integrated in the sensor housing for measuring a thickness of a layer on a fuel rod; and a carrier body carrying the measuring devices and being mounted on a plurality of guide rolls disposed to be guided along the fuel rod.

In other words, the objects of the invention concerning the measuring head are achieved by a sensing tip which is arranged on a sensor housing, and with a layer thickness measuring probe integrated into the sensor housing.

In this context, the invention is based on the consideration that particularly effective data acquisition, which is therefore favorable in terms of the length of time required, is made possible when determining the ageing state of the installed part in question by virtue of the fact that a combined determination of various measured values is carried out. For this purpose, the measuring head is equipped, in a combined design, with various types of measuring probes which allow various types of data to be determined simultaneously on the installed part which is to be examined. The measuring probes are designed to record the data which is of relevance to the desired information concerning the ageing state of the installed part, having a sensing tip which can be guided in mechanical contact along the surface of the object to be examined in each case for determination purposes, on the one hand, and a measuring probe for determining the layer thickness of an oxide layer, on the other hand.

To allow reliable determination of the thickness of the oxide layer using relatively simple means, the layer thickness measuring probe advantageously comprises a coil arrangement connected to an eddy current measuring appliance. The layer thickness measuring probe which includes the coil arrangement is in this case designed in particular to determine the thickness of a layer which is not electrically conductive—specifically in the present case the oxide layer—using what is known as the "lift-off effect." When exploiting this effect, the change in impedance in the coil as a function of the change in the distance of the coil arrangement from an electrically conductive measurement object is employed. The electrically conductive measurement object used in this case is the metallic tubular cladding of the fuel rod or the metallic base material of the respective fuel assembly channel, spacer or other structural part. The distance between the base material and the coil is in this case given on the one hand by the (constant) distance between the coil arrangement and the front edge of the sensing tip guided along the surface of the oxide layer and on the other hand by the layer thickness of the oxide layer itself which is to be determined. The coil arrangement, which is operated at high frequency, in this case generates an eddy current in the base material or in the tubular cladding which is used as the electrically conductive measurement object, and this eddy current in turn has an effect on the impedance of the coil as a function of the distance.

In a particularly advantageous configuration, the layer thickness measurement probe is disposed inside the sensor housing behind the sensing tip. With a configuration of this type, in which the symmetry or central line of the sensing tip is preferably congruent with that of the coil arrangement, the geometric conditions allow particularly unambiguous determination of the distance from the coil arrangement to the tip of the sensing needle, so that the sum which remains when determining the distance from the coil arrangement to the electrically conductive measurement object can be particularly reliably assigned to the layer thickness of the oxide layer. Furthermore, a configuration of this type also allows cumulative determination of data both for the contour profile via the sensing tip and for the profile of the layer thickness of the oxide layer via the coil arrangement on a common measurement line, so that two sets of measurement data are present for a single local partial area of the corresponding fuel rod or spacer. This also allows the measurement data to be evaluated with a view to a possible correlation between the measured diameter or geometry changes and the measured layer-thickness of the oxide layer. Particularly reliable conclusions as to the ageing-induced state of the installed part in question can be achieved in particular on the basis of a combined assessment of this nature.

For particularly reliable measurement of the contour parameter or profile, the sensing tip is advantageously made from diamond, in which case in particular the relatively high hardness of this material produces favorable wear properties for the sensing tip.

With regard to the measuring device which is particularly suitable for measuring a fuel rod, a fuel assembly channel or a spacer, the above object is achieved by a sensing arm which is arranged on a carrier body and, at a free, laterally deflectable end, bears a measuring head of the above type. A measuring device of this type allows combined and therefore simultaneous measurement of a contour parameter, on the one hand, and the thickness of an oxide layer, on the other hand, in a particularly simple way. In this case, the measuring device is configured in such a manner that the sensing tip of the measuring head can be guided along the object which is to be examined in mechanical contact therewith. A measured value which is characteristic of the contour of the object to be examined can in this case be determined on the basis of the deflection of the sensing arm, while at the same time the layer thickness measuring probe which is integrated in the measuring head supplies a measured value for the thickness of the oxide layer at exactly the same location.

In this context, reliable determination of the deflection of the sensing arm can be achieved in a particularly simple way if the sensing arm is advantageously mounted on the carrier body via a bending joint which is assigned a sensor for recording its bending angle. On account of the geometric conditions, a characteristic value for the corresponding lateral deflection of the measuring head can be derived unambiguously from the bending angle.

The measuring device can be produced with particularly little outlay, in particular on materials, if the sensing arm is advantageously configured as a deflectable spring steel sheet.

In a particularly advantageous refinement, a strain gauge is arranged on the sensing arm of the measuring device. In this case, a measurement signal which is characteristic of the lateral expansion of the surface of the sensing arm can be provided via the strain gauge with a relatively high accuracy. This allows a reliable conclusion to be drawn as to the corresponding deflection of the sensing arm at its free end with a particularly high resolution. Particularly in combination with the bending joint whose bending angle can be recorded, combined fine and coarse measurement of the deflection of the sensing arm can in this case be achieved, which on the one hand allows a relatively high-resolution measurement with a wide measuring range or on the other hand a redundant and therefore particularly exact measurement of the deflection within a relatively small measuring range.

In a particularly advantageous configuration, a number of measuring devices of this type are used in a fuel rod testing assembly or in a testing assembly for a fuel assembly channel or a spacer of a fuel assembly. In this case, a number of measuring devices of this type are expediently provided in a fuel rod testing assembly, in which case a carrier body which is common to the measuring devices is mounted on a number of guide rolls which can be guided along a fuel rod.

The advantages which are achieved by the invention consist in particular in the fact that the combined provision of suitable measuring means both for determining a contour parameter, for example as a basis for the determination of a diameter characteristic value, and for the determination of a measured value for the thickness of the oxide layer allows simultaneous measurement of these parameters, and moreover still represents the same spatial area of the measurement object. The outlay on time and logistics required to carry out the measurements which are necessary in order to characterize a fuel rod or spacer is therefore kept particularly low. Consequently, it is possible to provide a particularly extensive set of data, which is therefore particularly characteristic of the general state of the components examined, even with relatively little intervention into the operating sequence of the nuclear engineering installation and in particular also in a relatively short measurement time. Furthermore, only a single generic type of measuring devices are required to provide the complete set of data, and consequently the logistical outlay and in particular the stock management of spare parts for these devices are kept particularly simple. Particularly with the coil arrangement arranged directly behind the sensing tip, moreover, the data are determined on a track or line, so that correlations between the contour and the thickness of the oxide layer can be taken into account in the analysis in a particularly simple way.

Other features which are considered as characteristic for the invention are set forth in the appended claims.

Although the invention is illustrated and described herein as embodied in a measuring head, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
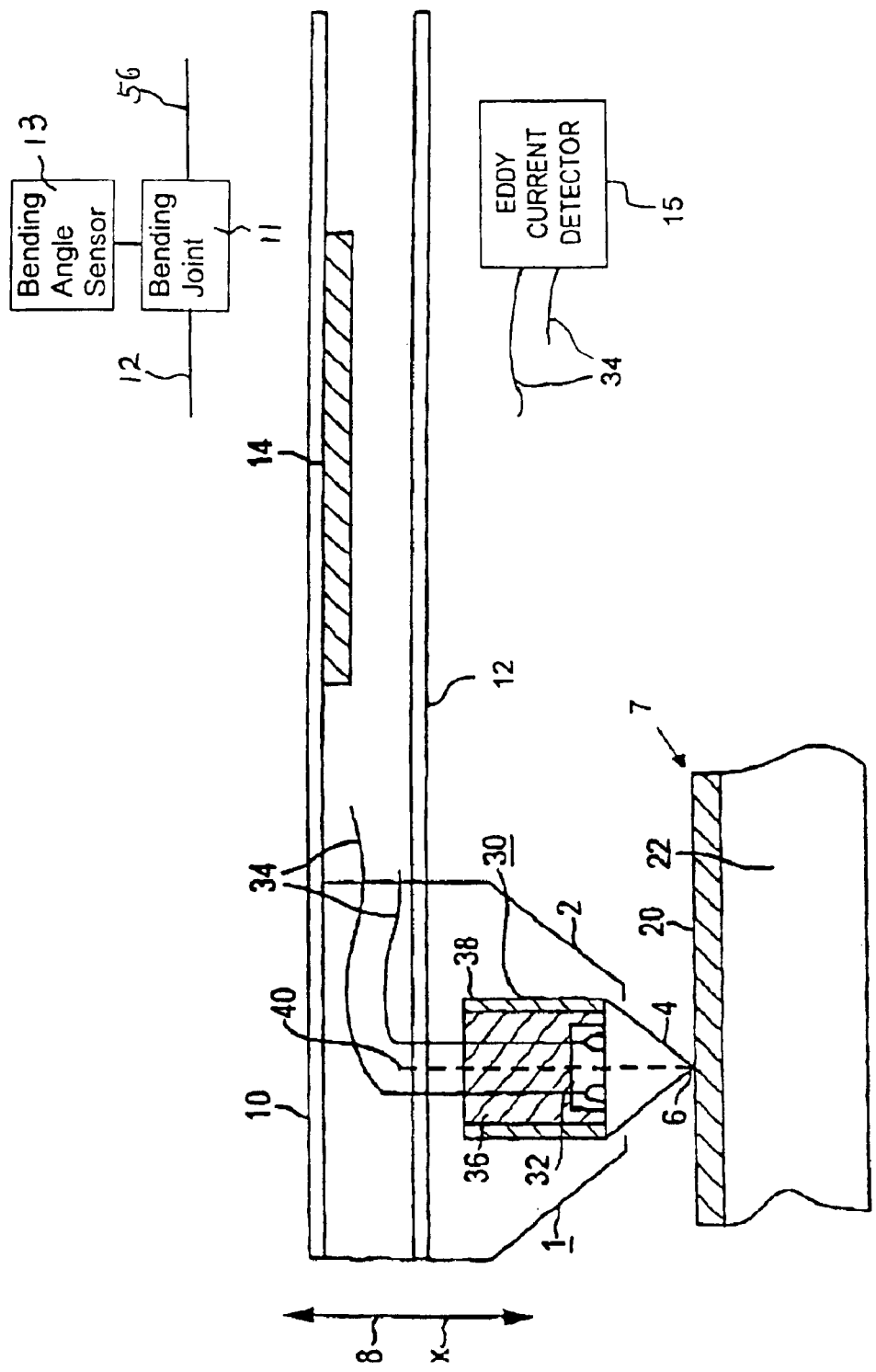
FIG. 1 side view of a section taken through a measuring head disposed on a sensing arm.

Referring now to the figures of the drawing in detail and first, particularly, to FIG. 1 thereof, there is shown a measuring head 1 for measuring an installed part, in particular a fuel rod of a fuel assembly channel or a spacer of a fuel assembly, in a nuclear engineering installation. The measuring head 1 is designed in such a manner that it is possible both to determine a contour or geometry characteristic value of an object to be examined, i.e., of the workpiece, and to determine the thickness of an oxide layer on the surface of the object which is to be examined simultaneously and in one measuring operation, in the manner of a combined measurement.

To determine a contour or geometry characteristic value, the measuring head 1 comprises a sensor housing 2 on which a sensing tip 4 is disposed. The sensing tip 4 is made from diamond, but may also be in multi-component form using a material with a suitably selected hardness. To determine a contour or geometry characteristic value of an object 7, which may in particular be a fuel rod or a spacer in a fuel assembly, the sensing tip 4 can be guided along the object, in mechanical contact therewith. Any change in the contour or geometry at the surface of the object to be examined results in a change in the position of the sensing tip 4 and therefore the measuring head 1 overall, in the direction x indicated by the double arrow 8. To provide a characteristic measured value for a change in position of this nature, the measuring head 1 is arranged at the free end 10 of a sensing arm 12. For its part, the sensing arm 12 is suitably secured to a carrier device 56 at its other end, which is not illustrated in more detail in FIG. 1. In the exemplary embodiment shown in FIG. 1, the sensing arm 12 is made from spring steel sheet. In this case, a deflection of the free end 10 of the sensing arm 12 as a result of a change in position of the measuring head 1 in the measuring direction x leads to bending or deformation of the spring steel sheet. This can be recorded quantitatively by way of a strain gauge 14 mounted on the surface of the sensing arm 12. Therefore, an assembly of this type makes it possible to record even relatively minor changes in the position of the measuring head 1 in the direction x with a high resolution.

As an alternative, or in addition, the sensing arm 12 may also be provided with a bending joint 11, the bending angle of which can be recorded using a suitable bending angle sensor 13. In that case, the position of the measuring head 1 in direction x can be determined by combined analysis of measured values of the strain gauge 14 and the bending angle sensor 13.

The measuring head 1 which is in this way suitable for providing a contour or geometry characteristic value is furthermore also configured to measure the thickness of an oxide layer 20 on the surface of an object 7 to be examined, carried by a metallic base material 22 of the object 7. For this purpose, a layer thickness measuring probe 30 is integrated in the sensor housing 2 of the measuring head 1. The layer thickness measuring probe 30 comprises a coil arrangement 32, which is connected, via signal lines 34 guided through the sensor housing 2 and through the sensing arm 12, to an eddy current detector 15. The coil arrangement 32 is cast into a carrier sleeve 38 by way of a potting compound 36, and the sleeve 38 is in turn secured in the sensor housing 2. The coil arrangement 32 is positioned in such a manner that its symmetry or center line is congruent with that of the sensing tip 4. Therefore, the layer thickness measuring probe 30 is disposed inside the sensor housing 2 behind the sensing tip 4.

The layer thickness measuring probe 30 is configured to determine the thickness of the oxide layer 20 on the basis of what is known as "lift-off effect." For this purpose, the coil arrangement 32 for supplying an eddy current detector is connected on the input side to a high-frequency generator via a Wheatstone bridge circuit. The output-side part of the bridge circuit is connected to an eddy-current measuring assembly by way of a transmitter. To determine the layer thickness of the oxide layer 20, the coil arrangement 32 is moved into a defined position close to the oxide layer 20. The defined position of the coil arrangement 32 with respect to the oxide layer 20 is in this case ensured by virtue of the fact that the coil arrangement 32, on account of its fixed installation in the sensor housing 2, adopts a defined and constant distance from the front edge of the sensing tip 4. The sensing tip 4 in turn—not least in order to carry out the contour measurement—is brought into direct physical contact with the surface of the oxide layer 20, and consequently exact positioning of the coil arrangement 32 with respect to the surface of the oxide layer 20 is automatically ensured.

When measuring the layer thickness of the oxide layer 20, the coil arrangement 32 is fed with a high-frequency input signal. The magnetic field generated by the coil arrangement 32 operated in this way produces an eddy current in the metallic base material 22 of the object 7 that bears the oxide layer 20. The resulting eddy current in turn affects the impedance of the coil arrangement 32. The level of this effect is dependent on the distance of the metallic carrier layer 22 from the coil arrangement 32. For its part, this distance is given by the sum of the distance of the coil arrangement 32 from the front edge of the sensing tip 4 and the thickness of the oxide layer 20. The bridge circuit used to operate the coil arrangement 32 therefore supplies as its output signal a voltage signal which for its part is characteristic of the thickness of the oxide layer 20 and can therefore be evaluated to provide the latter.

Figure 2:
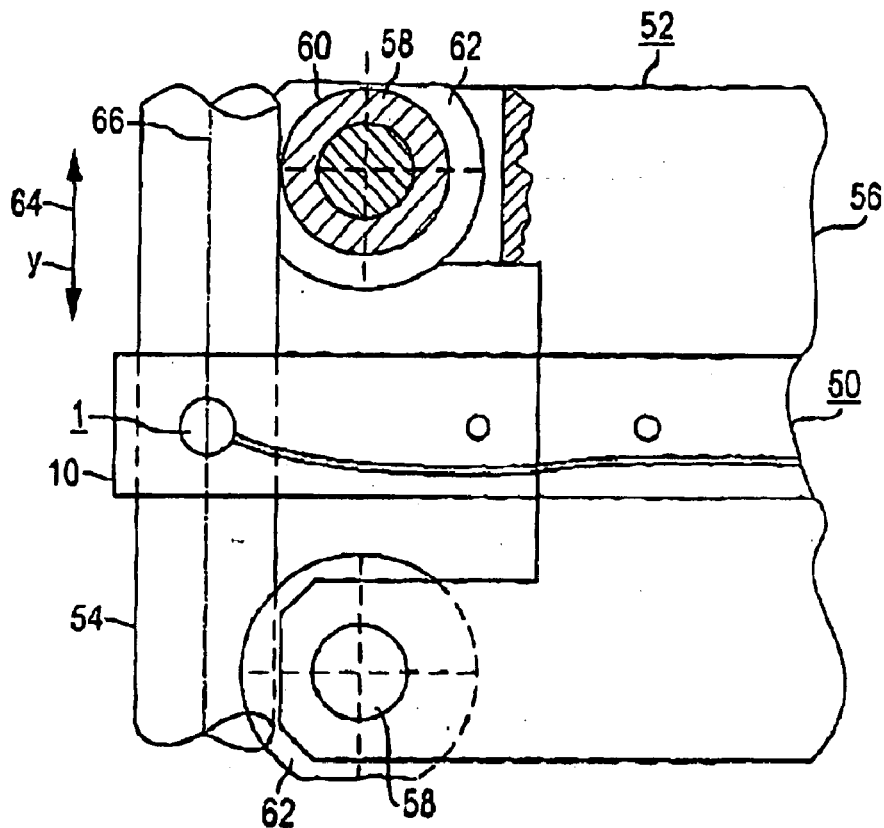
FIG. 2 is a diagrammatic illustration of a side view of a fuel rod testing assembly.
Figure 3:
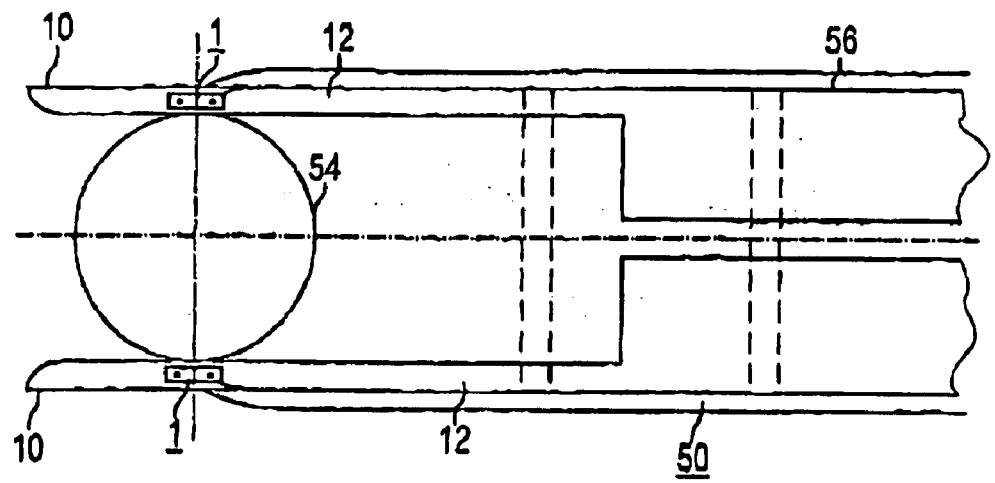
FIG. 3 is a diagrammatic plan view of the fuel rod testing assembly of FIG. 2.

The measuring head 1 is therefore suitable for the simultaneous determination of the contour, on the one hand, and the thickness of a surface oxide layer 20 of the object 7 to be examined, on the other hand. Therefore, the measuring head 1 can particularly advantageously be used for time-saving measurement of installed parts, in particular of fuel rods, fuel assembly channels, spacers or other structural parts in a nuclear engineering installation in order to allow reliable estimation of their ageing state or expected remaining service life. For this purpose, the measuring head 1, as shown diagrammatically and in side view in FIG. 2 and in plan view in FIG. 3, can be used in a measuring device 50 which for its part in turn forms part of a fuel rod testing assembly 52. The measuring device 50 shown in FIGS. 2 and 3 comprises two sensing arms 12, at the free, laterally deflectable end 10 of which in each case one of the measuring heads 1 is arranged. In this case, as can be seen in particular from the plan view shown in FIG. 3, the sensing arms 12 are arranged opposite one another in the style of a fork and are therefore suitable for engaging around a fuel rod 54 which is guided between them and is to be tested. The measuring heads 1 are in this case arranged opposite one another, so that the fuel rod 54 can be scanned on both sides. On account of this arrangement of the measuring heads 1 opposite one another, it is possible to determine a characteristic value for the diameter of the fuel rod 54.

The sensing arms 12 are arranged on a common carrier body 56, which for its part is mounted on a number of guide rolls 58 which can be guided along the fuel rod 54. The guide rolls 58 in each case comprise a central roll body 60 which is delimited on both sides by in each case one guide disk 62. The guide disks 62 have a greater diameter than the diameter of the roll body 60. A roll body 60 which rolls along the surface of the fuel rod 54 is therefore automatically centered with respect to the fuel rod 54 which is to be examined by the guide disks 62 which delimit it.

The fuel rod testing assembly 52 together with its measuring device 50 can be moved along the fuel rod 54, in the longitudinal y-direction of the fuel rod 54 indicated by the double arrow 64, by means of a drive device. As a result, if necessary the fuel rod 54 can be scanned along its longitudinal direction y. This scanning on the one hand, in the style of a profile measurement, provides contour measured values on the basis of the sensing tips 4 of the measuring heads 1, which in turn can be converted into position-dependent diameter characteristic values for the fuel rod 54. This scanning in this case takes place along a scanning track indicated by the line 66. Furthermore, during the scanning, the layer thickness measuring probes 30 of the measuring heads 1 provide position-dependent characteristic values for the thickness of an oxide layer which may surround the fuel rod 54. The corresponding measured values are in this case likewise recorded along the sensing track 66 directly via the corresponding sensing tip 4 on the basis of the positioning of the corresponding coil arrangement 32. Therefore, scanning of the fuel rod 54 which takes place simultaneously for both relevant parameters in this way results in a particularly extensive set of data for the fuel rod 54 being provided within a relatively short measuring time, on the one hand, while on the other hand it is also possible to analyze any correlations between the local layer thickness of the oxide layer and the local diameter value of the fuel rod 54 on the basis of the local correspondence between the respective measurement parameters.

Figure 4:
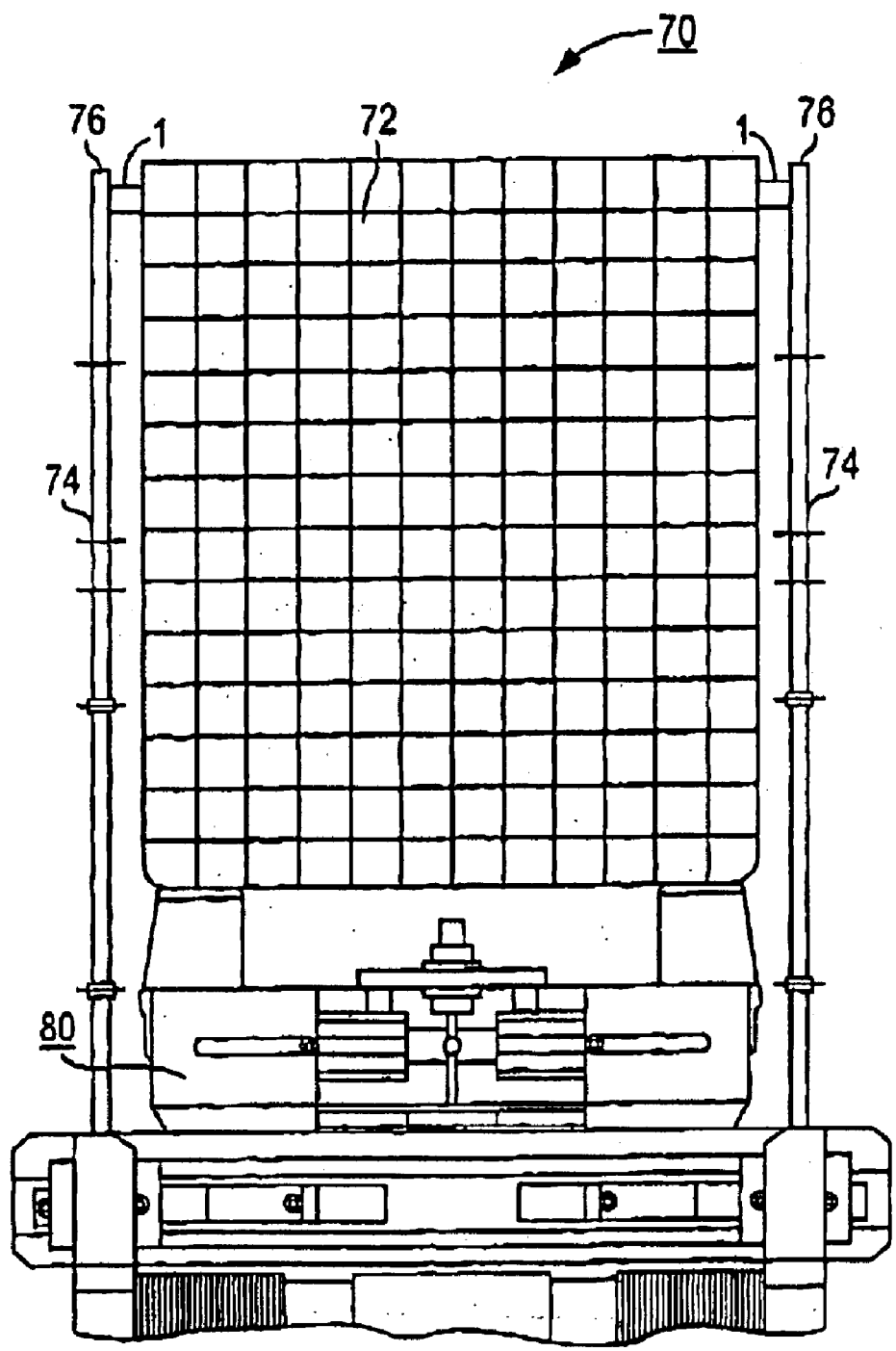
FIG. 4 is a diagrammatic plan view of a measuring device for a spacer.

Alternatively, the measuring head 1 may also be used in a measuring device 70 for a spacer 72 of a fuel assembly, as diagrammatically indicated in plan view in FIG. 4. The measuring device 70 shown in FIG. 4 in this case likewise comprises two sensing arms 74, at the free, laterally deflectable end 76 of which in each case one of the measuring heads 1 is disposed. In this measuring device 70 too, the sensing arms 74 are arranged opposite one another in the style of a fork and are therefore suitable for engaging around the spacer 72 which is guided between them and is to be tested. The sensing arms 74 of the measuring device 70 are arranged on a guiding and advancing unit 80 as a common carrier body with the components thereof which are customarily provided.

We claim:

1. A fuel rod testing assembly, comprising:
   a plurality of measuring devices each having a sensing arm with a laterally deflectable free end and a measuring head carried on said free end of said sensing arm; and
   a carrier body carrying said plurality of said measuring devices and being mounted on a plurality of guide rolls disposed to be guided along a fuel rod;
   said measuring head of said measuring device having:
   a sensor housing;
   a sensing tip for determining a contour or geometry characteristic value of the fuel rod, said sensing tip being disposed on said sensor housing; and
   a layer thickness measuring probe integrated in said sensor housing for measuring a thickness of a layer on the fuel rod.

2. The fuel rod testing assembly according to claim 1, wherein said layer thickness measuring probe comprises a coil arrangement connected to an eddy current detector.

3. The fuel rod testing assembly according to claim 1, wherein said layer thickness measuring probe is disposed inside said sensor housing, behind said sensing tip.

4. The fuel rod testing assembly according to claim 1, wherein said sensing tip is made from diamond.

5. The fuel rod testing assembly according to claim 1, wherein said sensing arm is disposed on said carrier body via a bending joint, and a sensor is disposed for recording a bending angle of said bending joint.

6. The fuel rod testing assembly according to claim 1, wherein said sensing arm is a deflectable spring steel sheet.

7. The fuel rod testing assembly according to claim 1, further comprises a strain gauge disposed on said sensing arm.

8. The fuel rod testing assembly according to claim 1 configured for testing any of a number structural parts of a nuclear engineering installation.

9. The fuel rod testing assembly according to claim 8 configured for testing a fuel rod, a fuel assembly channel, or a spacer of the nuclear engineering installation.

* * * * *